United States Patent [19]
Sundaram

[11] Patent Number: 6,140,814
[45] Date of Patent: Oct. 31, 2000

[54] DISK GLIDE TESTING WITH ZONE DETECTION

[75] Inventor: Ramesh Sundaram, Fremont, Calif.

[73] Assignee: Seagate Technology, Inc., Scotts Valley, Calif.

[21] Appl. No.: 09/135,777

[22] Filed: Aug. 18, 1998

Related U.S. Application Data

[60] Provisional application No. 60/074,228, Feb. 10, 1998.

[51] Int. Cl.[7] .................................................. G01R 33/12
[52] U.S. Cl. .......................... 324/212; 360/78.04; 73/105
[58] Field of Search ..................................... 324/210–212; 360/105, 75, 113, 135, 78.04; 73/105

[56] References Cited

U.S. PATENT DOCUMENTS

| | | | |
|---|---|---|---|
| 5,446,606 | 8/1995 | Brunner et al. | 360/75 |
| 5,586,040 | 12/1996 | Baumgart et al. | 364/474.08 |
| 5,635,269 | 6/1997 | Weir et al. | 428/65.3 |
| 5,675,462 | 10/1997 | Ayabe | 360/135 |
| 5,714,207 | 2/1998 | Kuo | 427/555 |

OTHER PUBLICATIONS

Erick Sawatzky, "Thermal asperities: MR heads face new dangers", Data Storage, Feb. 1998, pp. 49–54.

E. Schreck et al., "Magnetic Readback Microscopy Applied To Laser–Texture Characterization In Standard Desktop Disk Drives", Advanced Technology Group, Maxtor Corporation, Oct. 17, 1997.

*Primary Examiner*—Jay Patidar
*Attorney, Agent, or Firm*—Clifford Chance Rogers & Wells L.L.P.

[57] ABSTRACT

A glide testing apparatus includes a motor assembly, a sensor element, a positioning assembly, and detection circuitry. The motor assembly rotates a magnetic disk about an axis. The sensor element produces a detection signal in response to disk surface characteristics. The positioning assembly positions the sensor element at selected radii from the axis of disk rotation, and the detection circuitry receives a signal from the sensor element to detect movement of the sensor element between a first zone on the disk and a second zone on the disk. Methods of distinguishing between two adjacent zones on a magnetic disk include rotating a magnetic disk about an axis and positioning a sensor element at selected radii from the axis of rotation. The methods can also include producing a signal in response to variations in the distance between the sensor element and the disk surface, and determining if the sensor element is positioned in a first disk zone or in a second disk zone by analyzing selected zone signal characteristics that distinguish the first disk zone from the second disk zone.

20 Claims, 4 Drawing Sheets

DISK GLIDE TESTING WITH ZONE DETECTION

Priority based on provisional patent application, Ser. No. 60/074,228 filed Feb. 10, 1998 entitled "An Improved Method Of Gliding Discs Using A Thermal Asperity Head" is claimed.

BACKGROUND INFORMATION

Disk drives are information storage devices that use thin film magnetic media to store data. A typical disk drive includes one or more rotatable disk having concentric data tracks wherein data is read or written. As the disk rotates, a transducer (or "head") is positioned by an actuator to magnetically read data from or write data to the various tracks on the disk.

When a typical contact start/stop (CSS) disk drive is at rest, the head rest upon the surface of the disk. As operation of the drive commences, the disk rotates and the head begins to slide against the surface of the disk. As the disk rotational speed increases, pressure effects caused by air flow between the surface of the disk and an air bearing surface of the head cause the head to float above the disk. Once a predetermined rotational speed and head fly height (i.e. float height) is reached, reading and/or writing of data may commence.

To maximize recording density and to ensure reliable disk operation, disk heads fly in close proximity to the disk surface. To enable low fly heights, a smooth head and a smooth disk surface are preferred. However, close operation of a smooth disk and head can cause "stiction" between the disk and head. Stiction is a type of friction caused by a variety of factors including static and adhesion forces between the disk and head. Stiction between a rotating disk and flying head can cause the head to impact the surface of the disk resulting in data loss and damage to both the disk and head. Stiction also occurs between the disk and head when the disk is at rest. At-rest stiction forces are generally greater than those between a flying head and rotating disk. In some circumstances, the disk rotating motor may not be able to overcome the at-rest stiction forces or the head and disk may incur permanent damage in overcoming these forces. Therefore, to ensure reliable operation of a disk drive, stiction forces must be controlled.

To overcome relatively high levels of at-rest stiction, a disk may include a highly textured landing zone wherein the disk head rest whenever the rotating disk is at rest or below the speed required for head flight. The texture in the landing zone may be increased relative to the remaining disk surface by applying pulsed laser radiation to the landing zone thereby forming regularly spaced bumps. Additionally, for stiction reduction and other reasons, the data storage areas of the surface may also be textured. In general, however, the data surface will still be substantially smooth compared to the landing zone. By including both a highly textured landing zone and a substantially smooth or lightly textured data zone, operational reliability of the disk drive can be improved.

After the data and landing zone are fashioned, the disk may still include undesired aberrations. For example, the disk may include protrusions in the data zone caused by defects in the disk coating process. If such protrusions are greater than the disk head fly height, they can impact the head during drive operation causing a head crash. To reduce this risk, a disk undergoes glide testing before being incorporated in a finished hard disk drive. During glide testing, the disk is placed on a rotating platter and a test head is flown over the surface of the disk. The test head fly height is maintained at or below the expected fly height of an operative drive head. Thus, the glide test system can detect, through sensed collisions, disk aberrations that would affect an operative head. Additionally, by testing the disk at a glide test head height below the nominal operative drive head height, expected deviations in the operative head height can be accounted for.

During glide testing, when the glide head is over the disk's data area, the linear velocity of the disk with respect to the glide head is maintained at a constant value. As a result, the glide test head can be maintained at a constant height. To maintain constant linear velocity, the disk rotation speed is gradually decreased as the glide head moves from smaller to larger radii within the data zone. Conversely, disk rotation speed is gradually increased as the glide head moves from larger to smaller radii in the data zone.

However, when the glide test head transitions from the data zone to the landing zone, the linear velocity of the disk is rapidly increased to obtain a greater landing zone head height compared to the data zone. This requires a step increase in disk speed at the transition point between the landing zone and the data zone. Typically, the glide testing apparatus determines this transition point using predetermined zone radius parameters entered into a glide tester control apparatus. Since the actual transition from the data zone to the landing zone can vary among manufactured disk, the predetermined zone parameters input to the glide tester may not accurately reflect the data and landing zone of the particular disk under test. This reduces the accuracy of the glide test and can reduce the reliability of drives using such tested disk. Consequently, advantages such as improved reliability of a disk drive may be obtained by more accurately determining the transition between a disk's landing zone and data zone during glide testing.

SUMMARY

In general, in one aspect, the invention features a glide testing apparatus for distinguishing adjacent zones on magnetic disk media. The glide testing apparatus includes a motor assembly, a sensor element, a positioning assembly, and detection circuitry. The motor assembly rotates a magnetic disk about an axis. The sensor element produces a detection signal in response to disk surface characteristics. The positioning assembly positions the sensor element at selected radii from the axis of disk rotation, and the detection circuitry receives a signal from the sensor element to detect movement of the sensor element between a first zone on the disk and a second zone on the disk.

Implementations of the invention may include one or more of the following features. The first disk zone can be a data zone and the second disk zone can be a disk head landing zone. The landing zone can include periodically spaced bumps. The sensor element can be a magnetoresistive read element or other thermal asperity sensor element, and the invention may include control circuitry to determines a zone transition point indicating a boundary between the first disk zone and the second disk zone.

Implementations of the invention may also include a certifier head and a glide testing head. The certifier had can write data to the magnetic disk surface and read data from the magnetic disk surface under control of the control circuitry. The glide testing head can be configured to float above the disk surface at a height determined by, among other things, the disk rotation speed. The glide head may be positioned by a positioning assembly at selected radii from the axis of disk rotation under control of the control circuitry. The control circuitry may alter the disk rotation speed as the glide head moves between the first disk zone and the second disk zone. The disk rotation speed may be altered as a continuous function as the glide testing head moves between radii within a disk zone and may be altered as a step function as the glide testing head moves from one disk zone to another. The glide testing head may further include a protrusion sensor to detect impacts between the glide testing head and magnetic disk surface protrusions.

In general, in another aspect, the invention features methods of distinguishing between two adjacent zones on a magnetic disk. Disclosed methods include rotating a magnetic disk about an axis and positioning a sensor element at selected radii from the axis of rotation. Additionally, the methods includes producing a signal in response to variations in the distance between the sensor element and the disk surface, and determining if the sensor element is positioned in a first disk zone or in a second disk zone by analyzing selected zone signal characteristics that distinguish the first disk zone from the second disk zone.

Implementations of the invention may include one or more of the following features. The methods may include determining a zone transition point. The zone transition point may be determined by moving the sensor element between the first zone and the second zone and determining the position at which the sensor element moves between the first disk zone and the second disk zone. The sensor element may be positioned using a disk head actuator assembly and may be a disk head magnetoresistive read element or a thermal asperity sensor element. Producing a signal at the sensor element may include producing the signal in response to thermal changes at the sensor element. The method may be practiced using a disk having a first disk zone with periodically spaced bumps and a second zone that is smooth compared to the first zone. Analyzing selected zone signal characteristics may include analyzing selected frequency components in the zone signal or may include determining the magnitude of the zone signal.

Implementations of the invention may also include storing the position at which the sensor element moves between the first disk zone and the second disk zone, moving a glide testing head between a position in the first disk zone and a position in the second disk zone, and altering the disk rotation speed as the glide testing head moves between the first disk zone and the second disk zones. Altering the disk rotation speed may include altering as a step function.

In general, in another aspect, the invention features a glide testing apparatus for distinguishing adjacent zones on a magnetic disk. The apparatus includes an assembly for positioning a sensor element at selected radii from an axis of rotation of the magnetic disk and detection means coupled to the sensor element. The detection means can detect adjacent zones on the magnetic disk.

Advantages of the invention include accurate detection of disk zone transition points, automated detection of disk zones, improved glide testing of a disk surface, and improved reliability of disk drives using tested magnetic media. Additional advantages will become clear through the description and claims that follow.

DETAILED DESCRIPTION

Figure 1A:
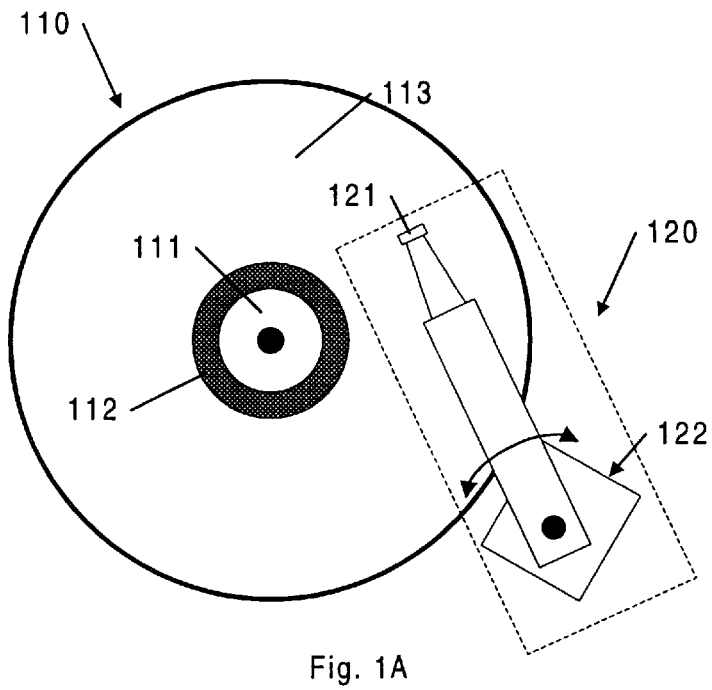
FIGS. 1A and 1B each illustrate a magnetic disk and head assembly.
Figure 1B:
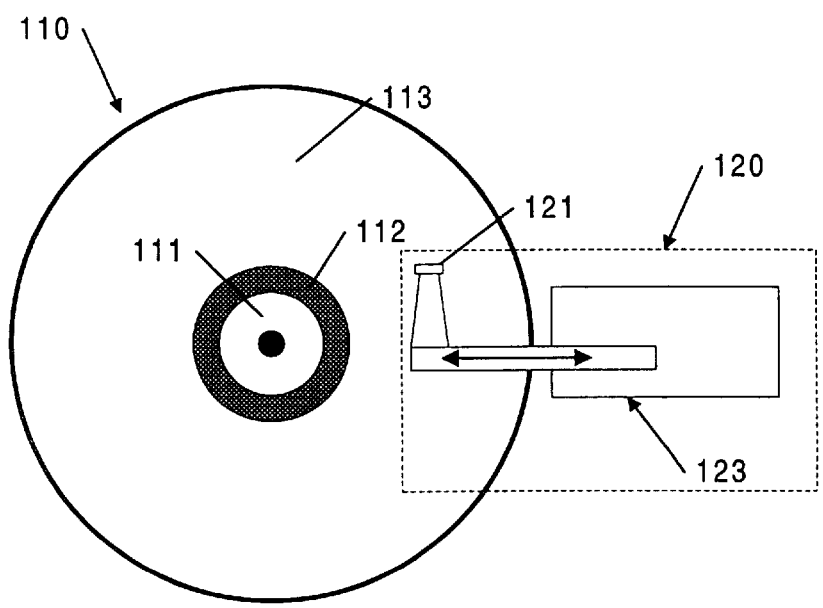

FIGS. 1A and 1B each show a magnetic disk 110 and a disk head assembly 120 for use in a contact start/stop disk system. In FIG. 1A, the assembly 120 includes a rotary head positioning actuator 122 while in FIG. 1B the assembly 120 includes a linear head positioning actuator 123. A typical disk 110 is formed on an aluminum alloy or glass substrate to which various coatings are sequentially applied. Typical coatings include an underlayer of chromium or a chromium alloy, a magnetic layer of cobalt or a cobalt-based alloy, a corrosion protective carbon overcoat, and a lubricant topcoat. Conventional aluminum alloy substrates may also be provided with a nickel-phos plating to increase the hardness of the substrate, to serve as a suitable surface for polishing, and to provide the requisite surface texture for the finished disk. Surface texturing can also be provided by other means, such as by laser texturing of the substrate.

A completed disk 110 includes a center portion 111 where the disk can be attached to a drive motor spindle, a landing zone 112, and a data zone 113. The data zone 113 includes numerous closely spaced concentric tracks where data can be stored. During operation, a flying disk head 121 is positioned over data zone tracks by a positioner assembly 122 to read or write data to tracks in the data zone 113. When the disk is at rest or rotating below the speed necessary for head flight, the head 121 is positioned in the landing zone 112 by the positioner 122. To reduce stiction, the landing zone 112 is textured by the use of a pulsed laser, ion-beam etching, reactive ion-beam etching, chemical etching, or other texturing means. Such texturing reduces the at-rest contact area between the head and disk and thereby reduces stiction bonding between the head and disk. This reduction in stiction bonding permits the disk to spin-up easier.

Figure 2A:
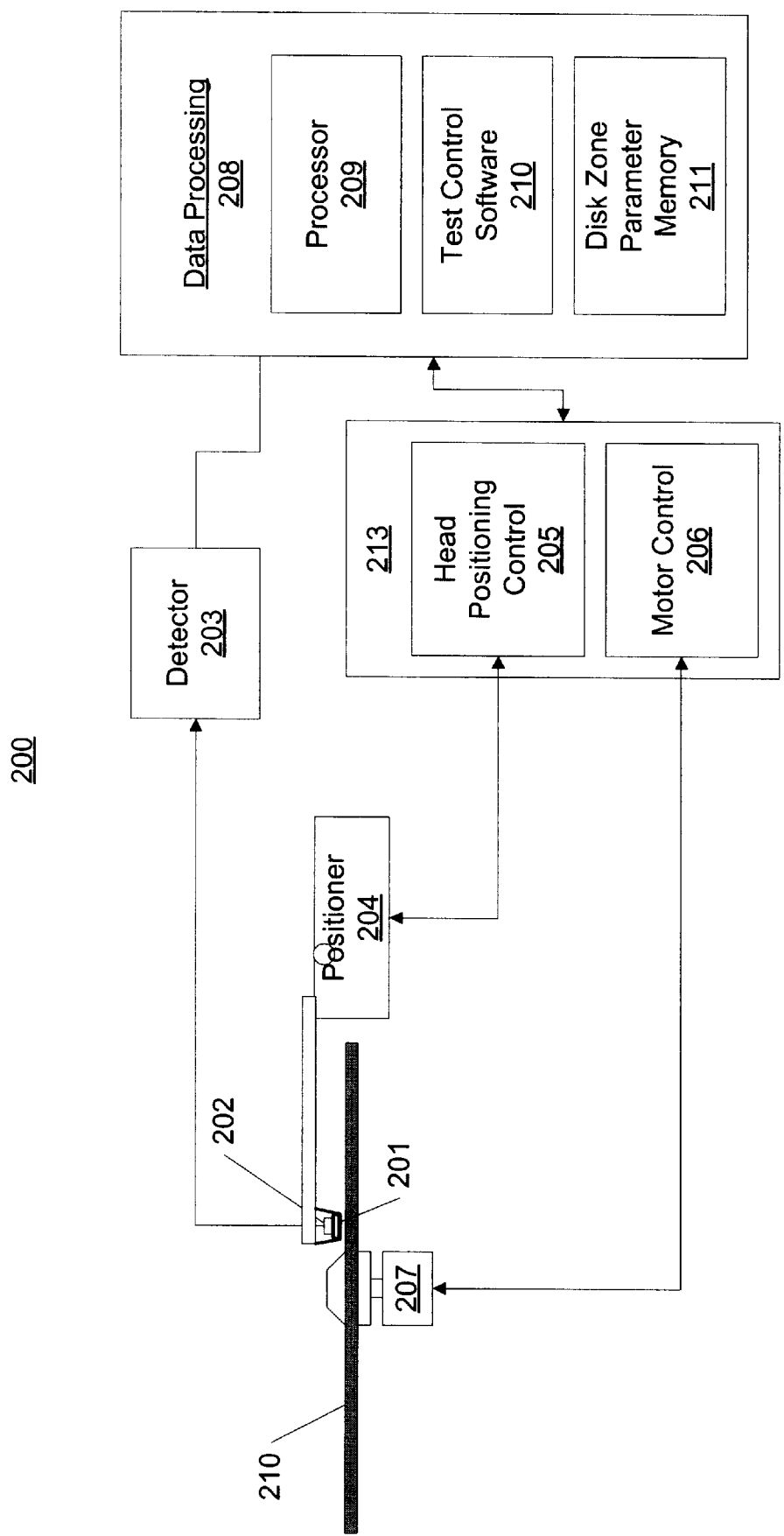
FIG. 2A illustrates a prior art glide testing system.

Prior to its use in a disk drive, a disk is tested using a glide test system to ensure that the data zone 113 and landing zone 112 are free of protrusions and other aberrations. Referring to FIG. 2A, a conventional glide testing system is shown. To perform glide testing, a test disk 210 is placed on the spindle of motor 207. The disk 210 is rotated by the motor 207 at speeds regulated by the motor controller 206 under command from glide test software 210. A dynamically loaded glide test head 201 is initially positioned at a point on the disk 210. The dynamically loaded test head 201 is mechanically held at a predetermined height above the disk surface when the disk is below the required head flight rotation speed. When the disk is rotating at a speed sufficient for head 201 flight, the test head 201 is released (dynamically loaded) and supported over the disk 210 at a test height ($\delta$). The height ($\delta$) is determined by the linear velocity of the disk 210 relative to the head 201 and the head air-bearing design, and is regulated by the control circuitry 206 and programs executed by the data processing components 210 of the system 200. Alternatively, the glide testing system 200 may use a contact start/stop mode in which the disk head can rest on the disk surface when the disk rotation speed is below that required for head flight.

Figure 2B:
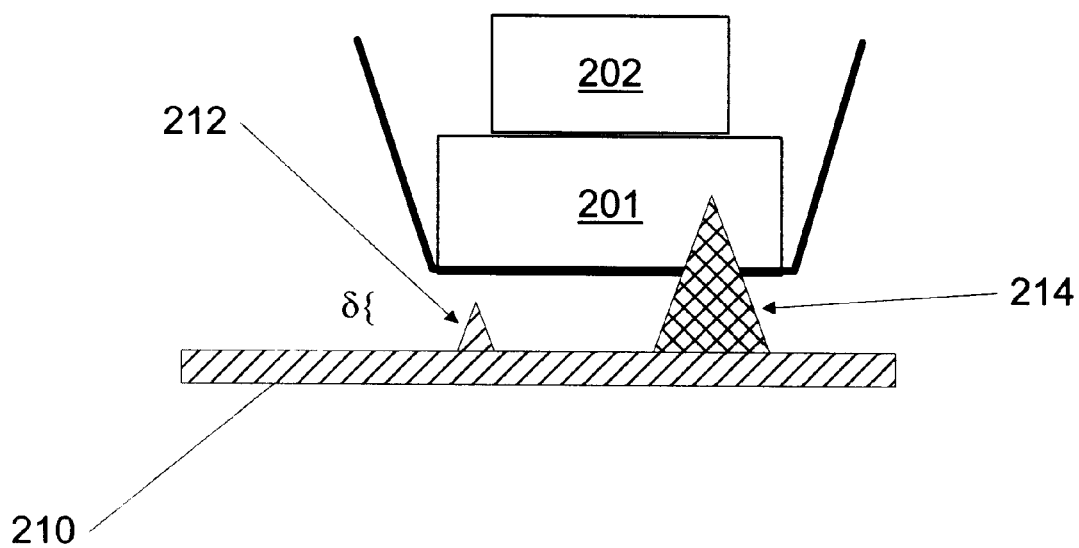
FIG. 2B illustrates a glide testing head and disk protrusions.

As the test head 201 floats above the rotating disk 210, the positioner 204, under control of the testing algorithms 210 and control circuitry 205, moves the head over the disk's data surface. Refer now to FIG. 2B which illustrates an detailed view of the test head 201 flying over a portion of the disk 210. As the disk 210 rotates, the head 201 is positioned over the disk's data area. During the disk rotations, the head 201 is brought within the path of protrusions in the covered tracks, such as protrusions 214 and 212. If the height (h) of a disk protrusion, such as that of protrusion 214, is greater than the glide testing height (δ) of the head 201, the protrusion will impact the test head. Such impacts cause a signal change in piezo-electric collision sensor 202 that can be detected by detection circuitry 203 and registered by the data processing unit 208. The processing unit 208 uses such collision information to determine whether the disk is acceptable for use in a hard disk drive. On the other hand, if the height (h) of a protrusion, such as that of protrusion 212, is less than the glide height (δ) of the test head, that protrusion will not impact the head 201 and will not be registered as a significant defect in the disk.

During glide testing, control programs 210 may command a rapid (step) reduction in disk rotational speed as the test head transitions from the landing zone to the data zone. This may be done to move the test head closer to the disk surface and thereby improve protrusion detection. To accurately control disk rotation speeds, and thereby obtain a desired disk linear velocity and head height as the test head transitions from the landing zone 112 to the data zone 113 (FIG. 1), the data processing unit 208 must determine the transition point between the landing zone and the data zone. This determination can be based on a sequence of predetermined parameters stored in tester memory 211 prior to disk testing. For example, memory 211 may include parameters representing the inside and outside diameters of each disk zone 112 and 113 (FIG. 1). However, since the precise transition point between these zones can vary among disk, such pre-computed information may not be accurate for the particular disk under test. Such inaccuracies can reduce testing precision and thereby reduce the reliability of drives incorporating such tested disks.

Figure 3:
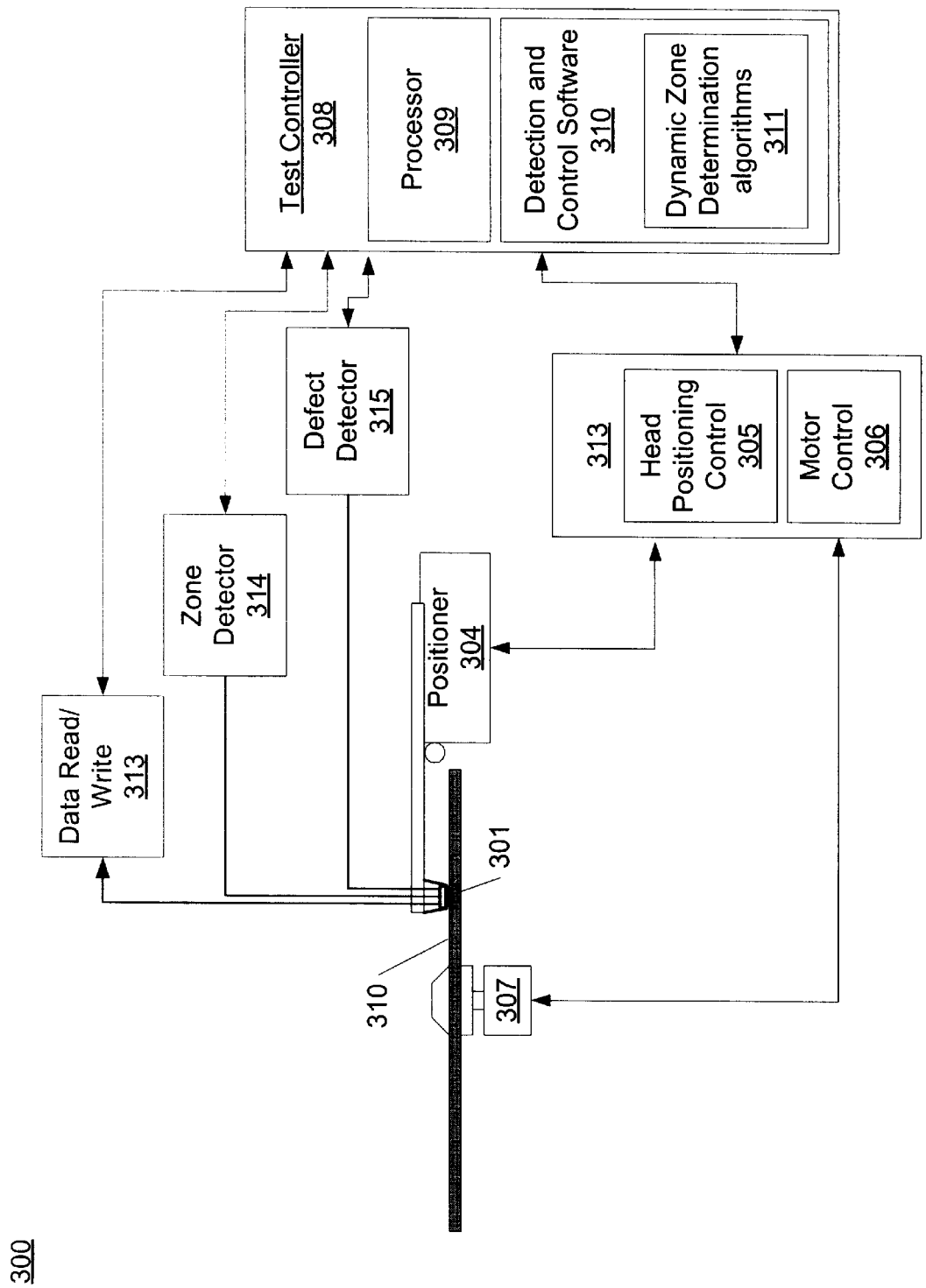
FIG. 3 illustrates a glide testing system, according to the invention.

Consequently, advantages in the manufacture of disk drives can be obtained through disk-specific zone determinations. Referring to FIG. 3, according to the invention, a glide testing system 300 can dynamically detect landing and data zones on a disk 310 being tested. The system 300 includes a test head 301. The test head 301 has a sensor element that can detect thermal changes. Thermal changes detected by the head 301 can be used to determine a transition point between the data zone 113 (FIG. 1) and the landing zone 112 (FIG. 1).

The test head 301 may be an multi-function head providing glide testing (protrusion detection), disk certification, and zone transition detection capabilities. In a multi-function head, the head 301 includes read and write functions to perform track-by-track read and write testing and includes thermal sensing capabilities to detect disk protrusions and perform disk zone detection. Alternatively, glide testing may be performed by a separate conventional glide test head (not shown) while the test head 301 is used to detect the transition point between the data zone 113 (FIG. 1) and the landing zone 112 (FIG. 1). The detected transition point can thereafter be used by the test controller 308 to position the separate glide test head.

In a multi-function head 301 implementation, the test head 301 can be a magnetoresistive (MR) head. A MR head 301 typically consists of a read element located in a space between two highly-permeable magnetic shields. The shields focus magnetic energy from the disc and reject stray fields and stray magnetic energy from the disk. The read element in a MR head is typically made from a ferromagnetic alloy whose resistance changes as a function of an applied magnetic field. This phenomenon, referred to as the anisotropic magnetoresistance (AMR) effect, allows the MR head to read data from a disk 310. To read data using a MR head 301, a constant current is applied to the head and a detector 313 detects changes in a voltage signal produced as the current is subject to resistance in the head's read element. When used in a disk drive, changes in resistance occurring as the read element is subject to changes in a disk's magnetic field produce a voltage signal according to Ohms law (V=IR).

The resistance of the read element in head 301 is further affected by its temperature. In particular, the resistance of the read element increases as the temperature of the element increases and, conversely, decreases as its temperature decreases. During operation of the system 300, collisions between the head 301 and protrusions on the disk 310 impart energy from the disk to the head causing a rise in read element temperature. Consequently, the element's resistance rises resulting in a voltage increase that is seen at the defect detector 315. To detect disk protrusions, the defect detector 315 includes analog or digital signal processing components to analyze changes in voltage seen at the detector. For example, the detector 315 may analyze the rate, duration, and magnitude of voltage changes. The magnitude may be computed as, for example, a root-mean-square (rms) of the signal magnitude within a predetermined time period or as an average of the absolute magnitude. Detected defects may subsequently be reported to the test controller 308.

The temperature of the read element is also affected by the distance between the head 301 and the surface of the disk 310. During operation, current passing through the read element at the head 301 results in heat generation at the read element. With respect to the head 301, the surface of the disk 310 acts as a heat sink. Dissipation of heat between the head 301 and the surface of the disk 310 is affected by the distance between the head 301 and disk 310 surface. As the head 301 moves closer to the surface of the disk 310, the rate of heat dissipation increases. As the rate of heat dissipation increases, the resistance of the head 301 decreases and the voltage seen at the head 301 decreases. Correspondingly, as the head 301 to disk 310 spacing increases, heat dissipation decreases and the voltage seen at the head 301 increases. The various resistance changes and detected voltage changes caused by heating and cooling of the head 301 can be used to detect whether the head 301 is over the landing zone or the data zone of the disk 310.

In a multi-function head 301, the thermal and magnetic resistance changes in the head 301 read element are additive. To simplify the detection of thermal changes, it may be desirable to isolate thermally induced resistance changes from those caused by magnetic flux from the disk 310. To do so, thermal detection may be provided by a second head (not shown) with a reduced sensitivity to magnetic fields. Such a head may be produced by altering the read sensor alloy used in a MR head. To reduce the read element's response to magnetic flux while retaining thermal response characteristics, the magnetically responsive read element alloy components can be reduced. In a MR head having a nickel-iron alloy read element, the iron content in the read element can be reduced or eliminated thereby reducing or eliminating the head's sensitivity to magnetic flux. This resulting head retains thermal asperity sensing properties, but has little or no sensitivity to magnetic signals.

Referring to FIG. 3, in the absence of collisions, and as the head 301 is flown over the light or moderately textured disk data zone, the distance between the media 310 and the head 301 is relatively constant or may include small variations. As a result, the heat exchange between the read element of head 301 and media 310 is likewise relatively constant. In contrast, as the head 301 moves from the data zone to positions over the landing zone, the head will pass over relatively large bumps on the textured landing zone surface. These landing zone bumps cause the head to disk spacing to decrease as the head passes over the bump and to increase as the head moves between bumps. As a result, heat dissipation from the read element in head 301 to the disk 310 will increase as the head approaches the disk 310 in the region of a texture bump, and will decrease as the head moves away from a texture bump.

Since the landing zone includes a relatively rough texture compared to the data zone, the rate of heat dissipation between the head's read element and the disk exhibits greater variations when the head is in the landing zone than in when it is in the data zone. As a result, heat induced resistance variations are smaller in the data zone than in the landing zone. In addition, on disks having landing zone bumps with a constant density or periodicity, the resistance variations will have periodic components. These resistance changes cause voltage variations in the voltage signal seen by the zone detector 314 that can be used to distinguish between the landing zone and the data zone.

In the system 300, the voltage output at the sensor acts as an input to zone detection circuitry 314. The circuitry 314, which can include frequency detection circuitry that uses analog or digital signal processing. By analyzing frequency components in the sensed signal, the detector 314 can determine whether the head 301 is placed over a disk data zone or a disk landing zone. In particular, the detector 314 can be configured to detect frequencies consistent with those produced when the head 301 is flown over landing zone bumps. For example, based on a known landing zone circumfrential bump density input to the controller 308, the controller can determine a frequency range value X as a function of the rotational speed of the disk and the radial location of the sensor with respect to the spindle axis. The control unit 308 then provides a signal to the detector 314 whereby the detector 314 will monitor its input signal from the sensor element for frequencies in the range λ. If frequency components in the range λ are detected, a signal can be sent from the detector 314 to the controller 308 to report the detected frequencies.

In some implementations, the detector 314 can analyze magnitude changes in the signal from head 301 irrespective of particular frequency component. In such a detector, the transition between the data and landing zones is determined by detecting a change in the magnitude of the signal produced at the head 301. As the head 301 transitions from the data zone to the landing zone, the increased surface texture in the landing zone will cause the root-means-square (RMS) magnitude of the detected thermally induced signal to increase relative to that detected in the data zone. Conversely, as the had 301 transitions from the landing zone to the data zone, the magnitude of the thermally induced signal will decrease.

A glide testing system 300 may include a second positioner to position a separate glide testing head. In such a case, the head 301 may perform zone detection and the separate glide testing head can be positioned by the second positioner to detect disk protrusions. In still another implementation, a glide testing head can be used to detect disk protrusions, a MR certifier head can be used to perform disk read and write certification, and a magnetically insensitive thermal asperity head can be used for disk zone detection. Additionally, the detection of the landing zone to data zone transition may be performed prior to protrusion detection and disk certification detection, or may be performed simultaneously with either protrusion detection or disk certification.

In various detector head implementations, the detector head may be powered by a constant or variable voltage source or a variable current source.

Still other embodiments are within the scope of the following claims.

What is claimed is:

1. A glide testing apparatus for distinguishing adjacent zones on magnetic disk media, the glide testing apparatus comprising:

a motor assembly for rotating a magnetic disk about an axis, the magnetic disk comprising a first disk zone having a first surface texture and a second disk zone having a second surface texture that is different from the first surface texture;

a sensor element, the sensor element producing a detection signal;

a positioning assembly for positioning the sensor element at selected radii from the axis of disk rotation; and detection circuitry operative to receive the detection signal and to detect movement of the sensor element from the first disk zone to the second disk zone.

2. The apparatus of claim 1 wherein:

the first disk zone is a data zone;

the second disk zone is a disk head landing zone; and the sensor element comprises a magnetoresistive read element.

3. The apparatus of claim 1 wherein the sensor element comprises a thermal asperity sensor element.

4. The apparatus of claim 1 wherein the first surface texture comprises periodically spaced bumps and the second surface texture is substantially smooth compared to the first surface texture.

5. The apparatus of claim 1 further comprising control circuitry operatively coupled to the positioning assembly and to the detection circuitry, and wherein the control circuitry is operative to determine a zone transition point, the zone transition point indicating the radial sensor element position at which the detection circuitry detects movement of the sensor element from the first disk zone to the second disk zone.

6. The apparatus of claim 5 further comprising:

a certifier head operative to write data to the magnetic disk surface and to read data from the magnetic disk surface and comprising the sensor element; and wherein the positioning assembly comprises a head positioning actuator, and the control circuitry is operatively coupled to the certifier head, and the control circuitry is configured to perform read and write testing as the certifier head is moved between selected radii.

7. The apparatus of claim 5 further comprising:

a glide testing head, the glide testing head being configured to float above the disk surface as a function of the disk rotation speed; and a glide head positioning assembly for positioning the glide testing head at selected radii from the axis of disk rotation; and wherein the control circuitry is operatively coupled to the glide head positioning assembly and to the motor assembly, and the control circuitry provides a position signal to the glide head positioning assembly whereby the glide head is moved between selected radii, and the control circuitry provides a disk rotation speed signal to the motor assembly to control the magnetic disk rotation speed.

8. The apparatus of claim 7 wherein the control circuitry alters the disk rotation speed as a step function as the glide testing head moves between the first disk zone and the second disk zone.

9. The apparatus of claim 7 further comprising a protrusion sensor operatively coupled to the glide testing head, the protrusion sensor operative to detect impacts between the glide testing head and magnetic disk surface protrusions.

10. The apparatus of claim 9 wherein the glide testing head comprises the sensor element and the protrusion sensor, and wherein the positioning assembly for positioning the sensor element and the glide head positioning assembly comprises a single disk head actuator.

11. The apparatus of claim 1 wherein the detection circuitry determines whether the detection head is positioned over the first or the second disk zone by analyzing the magnitude of selected frequency components in the detection signal.

12. The apparatus of claim 11 wherein the selected frequency components are chosen as a function of disk zone circumferential bump density.

13. A method of distinguishing between two adjacent zones on a magnetic disk, the method comprising:

rotating a magnetic disk about an axis, the magnetic disk comprising a first zone having a first disk surface texture and a second zone having a second disk surface texture;

positioning a sensor element at selected radii from the axis of rotation of the magnetic disk;

producing a zone signal at the sensor element in response to variations in the distance between the sensor element and the disk surface; and determining if the sensor element is positioned in the first zone by analyzing selected zone signal characteristics distinguishing the first disk zone.

14. The method of claim 13 further comprising determining a zone transition point, the zone transition point being determined by moving the sensor element between a position in the first zone and a position in the second zone and determining the sensor element position at which the sensor element moves between the first disk zone and the second disk zone.

15. The method of claim 13 wherein positioning a sensor element comprises positioning a floating disk head, and wherein the floating disk head comprises the sensor element.

16. The method of claim 13 wherein the sensor element comprises a magnetoresistive read element and producing a signal at the sensor element comprises producing a signal in response to thermal changes at the sensor element.

17. The method of claim 13 wherein the first surface texture comprises periodically spaced bumps and the second surface texture is smooth compared to the first surface texture.

18. The method of claim 17 wherein analyzing selected zone signal characteristics comprises analyzing selected frequency components in the zone signal.

19. The method of claim 14 further comprising:

storing the sensor element position at which the sensor element moves between the first disk zone and the second disk zone;

moving a glide testing head between a position in the first disk zone and a position in the second disk zone; and altering the disk rotation speed as the glide testing head moves between the first disk zone and the second disk zones.

20. A glide testing apparatus for distinguishing adjacent zones on a magnetic disk, the apparatus comprising:

an assembly for positioning a sensor element at selected radii from an axis of rotation of the magnetic disk; and detection means coupled to the sensor element, the detection means operative to detect adjacent zones on the magnetic disk.

* * * * *